United States Patent [19]

Reiter et al.

[11] Patent Number: 5,062,572

[45] Date of Patent: Nov. 5, 1991

[54] SPRAY SHIELD

[75] Inventors: Roger Reiter, Saskatoon; Stanley Boyko; Nadina Boyko, both of St. Brieux, all of Canada

[73] Assignee: F. P. Bourgault Industries, Saskatchewan, Canada

[21] Appl. No.: 554,242

[22] Filed: Jul. 17, 1990

[30] Foreign Application Priority Data

Nov. 7, 1989 [CA] Canada .................................. 2002372

[51] Int. Cl.$^5$ ............................................... B05B 1/28
[52] U.S. Cl. .................................... 239/899; 239/300; 239/290
[58] Field of Search ............................. 239/288–288.5, 239/290, 295, 296, 297, 299, 172, 300; 47/1.5, 48.5

[56] References Cited

U.S. PATENT DOCUMENTS 4,927,080  5/1990  Alsing .................................. 239/295

FOREIGN PATENT DOCUMENTS

1094517  1/1981  Canada .
1206126  6/1986  Canada .
1225374  8/1987  Canada .

Primary Examiner—Andres Kashnikow
Assistant Examiner—Karen B. Merritt
Attorney, Agent, or Firm—Peter C. Van Der Sluys

[57] ABSTRACT

For use with agricultural sprayers, a unique spray shield is disclosed. The shields are mounted in pairs along the wet spray boom fore and aft in approximately the same plane, thereby shielding the nozzles of the sprayer. The shields are elongate and each is equipped with an air intake opening facing away from the wet spray boom. An air outlet of smaller cross-section is located at the bottom of each shield. As the sprayer moves in a direction against the wind, air enters the intakes of the fore shields and is directed downwardly and outwardly at a greater velocity thereby producing a curtain of air immediately in front of the sprayed area, thereby breaking the wind and avoiding disruption of the spray. Similarly, on the return passage over the land when the wind is blowing from the rear of the implement, the spray shields on the rear of the spray boom entrap the air and turn it downwardly, again creating a curtain of air behind the sprayed area.

12 Claims, 8 Drawing Sheets

SPRAY SHIELD

FIELD OF THE INVENTION

This invention relates to agricultural liquid sprayers and, particularly, to wind shields for such sprayers.

BACKGROUND OF THE INVENTION

Field sprayers have become increasingly larger with a wide spray area as production areas, and farming has become more capital-intensive. Liquid sprayers are used for applying pesticides, herbicides and fertilizers. The timing of such applications is critical at certain periods of the year.

One of the problems encountered in spraying is that on the prairies or other wide-open areas, there is constant wind which may blow for as long as a week or two at a time, thereby preventing the farmer from carrying out an effective spraying program when and where he wants to.

In order to alleviate this problem, various devices have been developed to reduce drift of the spray caused by the wind. The basic concept has been to provide a shroud or cover over the spray boom to prevent the wind from entering the area being sprayed. Such a structure may comprise a drape, a snow fence type structure, or skirt. Such a device is disclosed and claimed in Canadian Patent 1,206,126 (McCrea).

Others have tried such things as an inflatable bag structure, such as that shown in Canadian Patent 1,094,517 (Jones).

Another type of device employs a type of air foil whereby the wind moves along over the skirt-like structure forcing it downwardly such as that shown in Canadian Patent 1,225,374 (Rogers).

Still others have attempted to protect the spray by means of an inverted cone around each of the nozzles, such as the Brandt "Wind Cone".

All of the above devices reduce drift to a certain extent, but generally at the expense of distribution. Furthermore, another serious problem with such devices is that spray nozzles and spray patterns are concealed from the operator by the shield making it difficult for the operator to tell if all the nozzles are operating properly. As well, many of these structures are extremely expensive to make and cumbersome to assemble, maintain, and clean.

The present invention seeks to solve the spray drift problem by employing an entirely new principle. Rather than blocking out the wind and reducing drift at the expense of distribution, the present invention employs the wind to the advantage of the sprayer.

It is an object of the present invention to provide a spray shield that is inexpensive to make, easy to assemble, and which fits most sprayers which employ wet spray booms which are transverse to the direction of travel in the field position.

It is a further object of the present invention to reduce drift and improve distribution of spray.

Finally, it is an object of the present invention to provide a spray shield which will not clog with chemicals and soil that requires little or no cleaning and maintenance, and still allows the operator to see the spray pattern from the tractor cab.

SUMMARY OF THE INVENTION

Therefore, this invention seeks to provide a spray shield for use with an agricultural liquid sprayer of the type comprising at least one elongate wet spray boom adapted to spray when said boom is in the field position transverse to the direction of travel;

said spray shield comprising an elongate structure adapted to be positioned longitudinally adjacent said wet spray boom and having an air intake adapted to be directed horizontally away from said wet spray boom, and an air outlet adapted to be directed downwards to one side of said spray boom;

said spray shield defining a passageway between said intake and said outlet such that during operation, air exiting through said outlet produces a downwardly directed curtain of air, thereby reducing the disruption of spray.

This invention further seeks to provide a spray shield adapted for use on an agricultural sprayer, said spray shield comprising:

an elongate structure, comprising an air intake which is substantially horizontally directed and an air outlet which is vertically downwardly directed, one side of said spray shield being concave between said intake and said outlet and the opposite side being convex between said inlet and said outlet;

said shield being hollow and defining a passageway of decreasing cross-section between said inlet and said outlet, wherein in operation said shield is longitudinally mounted along a wet spray boom of an agricultural sprayer and in substantially the same horizontal plane as said wet spray boom, thereby directing air from the horizontal plane vertically downwards in a curtain.

In the present invention, pairs of elongate spray shields are attached along the spray boom fore and aft. Although the shields can be of any length, the preferred embodiment is to employ sections approximately one foot long which are jointed together to fit various sections along the wet spray boom. These are mounted throughout the length of the spray booms. Such shields can be used on both a two-wing sprayer and a central boom two-wing sprayer, or any combination of the two. Since most modern sprayers raise and lower the wet spray boom from a transport to a field working position, it is necessary to allow the framework connecting the wet spray boom to the dry spray boom to raise and lower without contacting or doing damage to the shields.

The spray shields of the present invention are in an elongate form and have a concave face and an opposite convex face. An air intake extends generally throughout the length of the shield. In transverse cross-section, the shield is curved in the shape of a horn such that the air inlet faces outwardly of the spray boom nozzle. The bottom of the shield has an outlet which also extends along the length of the shield. The shield is a hollow structure, such that when air (wind) enters the intake or inlet it is deflected vertically downwards and outwards from the air outlet thus producing an air curtain.

In a preferred embodiment, the outlet is considerably narrower than the inlet and the shield has a decreasing cross-sectional area between the inlet and the outlet. When air enters into the intake or inlet, it increases in velocity as it leaves the outlet. Below the inlet is a concave face. The opposite side is convex. The shield extends upwardly just above the wet spray boom and downwardly a sufficient distance below the nozzle. On the rear side of the spray boom are other shields identical to the front shield.

In an alternative embodiment one or both of the intake and the outlet is/are equipped with a baffle and the hollow shield is of constant or varying cross-section. By adjusting the baffle(s) the size of the opening of the intake or the outlet can be regulated. In other words a decrease in the size of the opening of the outlet, while maintaining a constant sized opening in the inlet, will result in a corresponding increase in the velocity of the air exiting the outlet and thereby create a stronger downwardly directed air curtain.

Spraying with the shields is carried out by pulling the sprayer implement across the field in either the same direction of the wind, or against the wind. It is recommended that spraying is not carried out across the wind, unless the wind is very light.

The spray shield achieves control of spray drift by redirecting some of the wind towards the ground to act as an air curtain. The primary air curtain is achieved by the air that enters the shield inlet. In the preferred embodiment, as the air is turned towards the ground, it is forced to speed up by constricting the flow as it approaches the shield outlet. A secondary air curtain is created by the air that strikes the shield below the shield inlet. In this area, the flow is forced towards the ground by the concave shape of the leading surface of the shield. The secondary air curtain is constricted by wind that strikes it as it moves down the surface of the shield. Below the spray shield the primary and secondary air curtains mix together and act as a single air curtain. The air curtain will mix with the wind below the shield, however, because the air curtain is moving faster than the wind at the level of the spray shield and the wind loses strength as it approaches the ground. This causes the air curtain to bend gently back and enter the crop canopy in the same region as the spray droplets.

Above the spray shield, the wind is not disturbed and continues past the spray shield without effecting the behaviour of the spray. As long as the spray boom is perpendicular to the wind direction, the shield can effectively protect the spray regardless of the direction of the relative wind, that is front or back.

The strength of the air curtain is of course dependent on the relative ground speed of the implement and the speed of the wind. For example, on a day when the wind is light, it is primarily the speed of the vehicle that will produce the air curtain. Naturally, the force of the air curtain will be less, when there is less wind. However, on a day with light winds, it is not necessary to form as strong an air curtain to shield the spray. Conversely, on a day with a strong wind and in the situation where the vehicle is moving against the wind, a strong air curtain will develop below the shield. Thus, a strong air curtain protects the spray when the wind would otherwise create a greater disruption of spray.

The shape of the openings and that of the shield can be varied as long as the basic principle is maintained. Naturally, it is preferable to have a solid air curtain from one end of the sprayer boom to the other in order to ensure minimum drift and maximum distribution.

BRIEF DESCRIPTION OF THE INVENTION

The invention will be more fully described in connection with the following drawings, wherein.

DETAILED DESCRIPTION OF THE INVENTION

Figure 1:
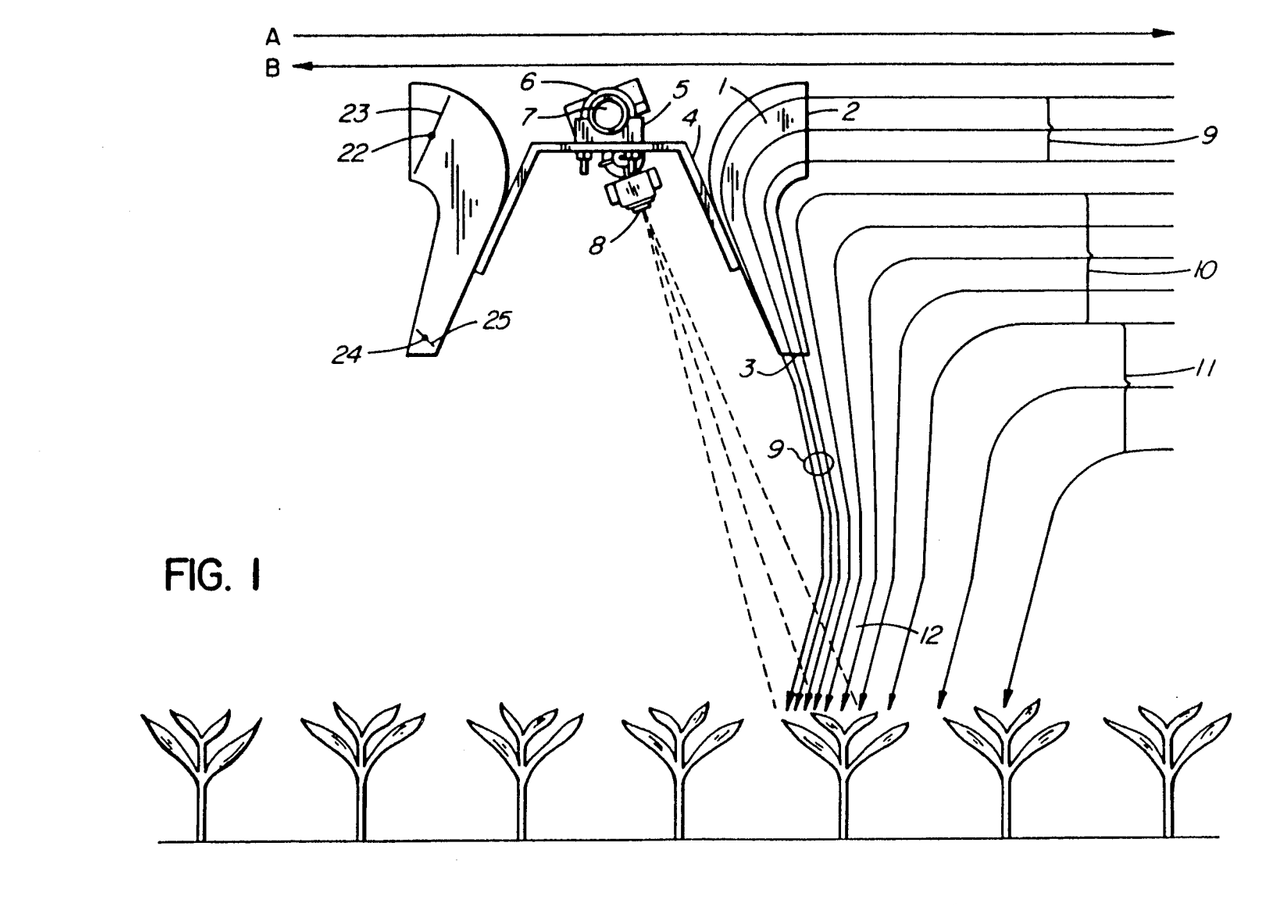
FIG. 1 is a transverse cross-section of a wet spray boom having a spray shield mounted on either side of it.
Figure 2:
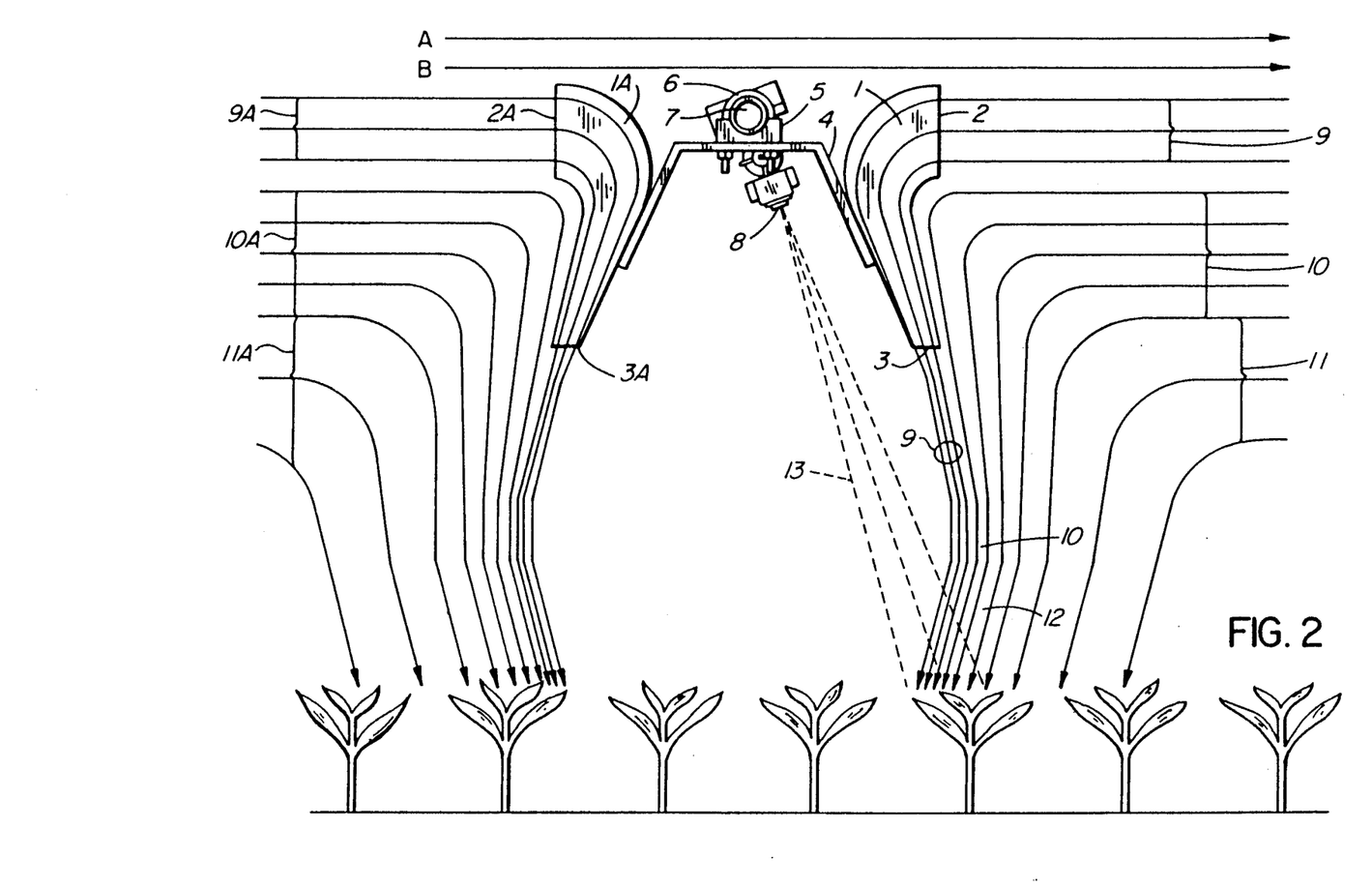
FIG. 2 is a drawing similar to FIG. 1 wherein the direction of the wind has changed.
Figure 3:
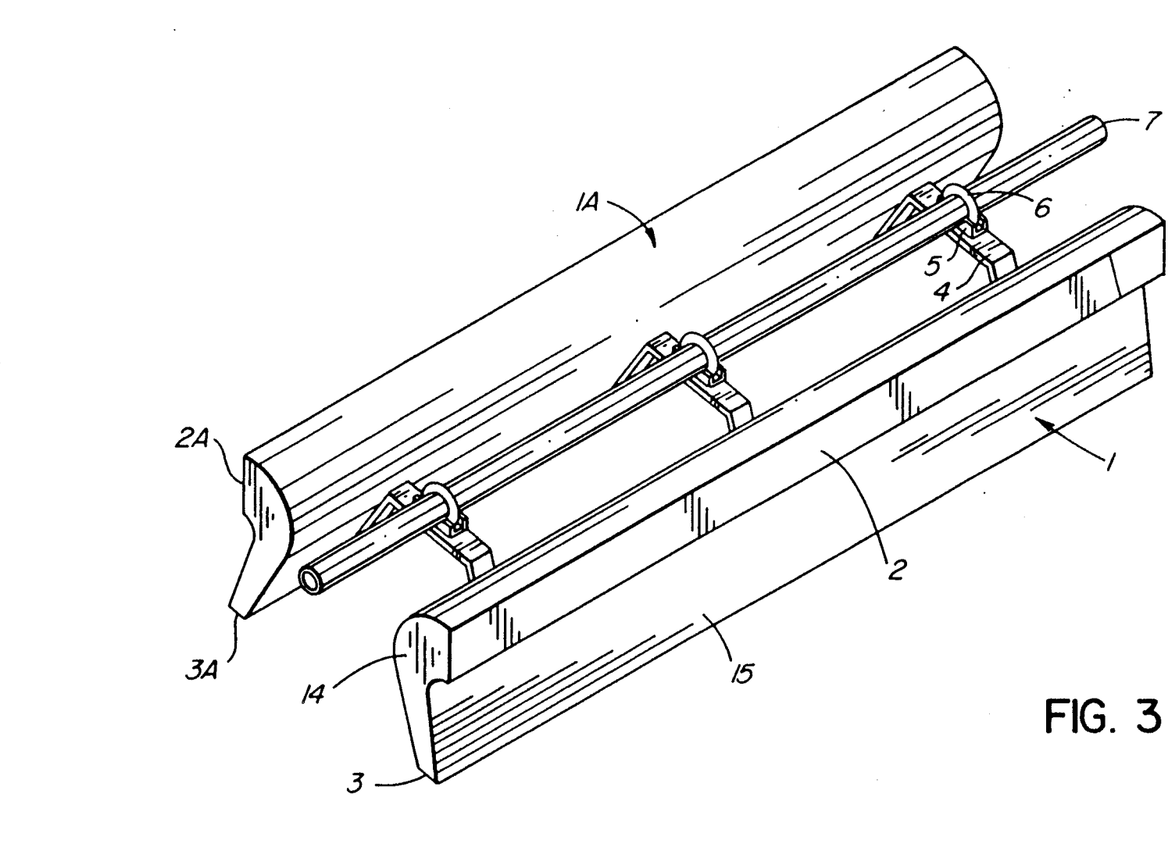
FIG. 3 is a perspective view of a pair of spray shields, each mounted on either side of a wet spray boom.
Figure 4:
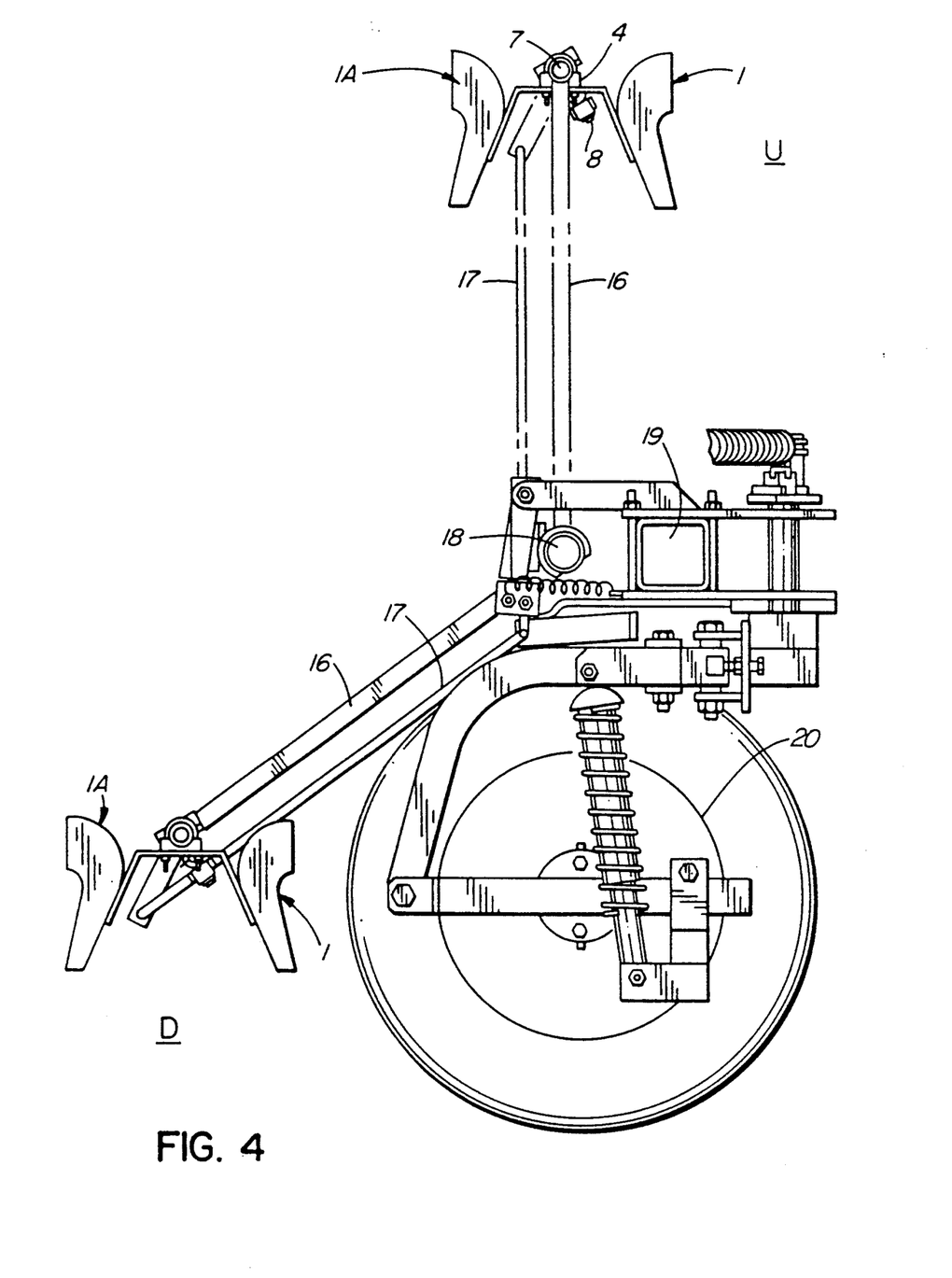
FIG. 4 is a cross-section of the main wing boom, dry spray boom and wet spray boom of an agricultural sprayer showing the wet spray boom in both the operating and the transport position.
Figure 5:
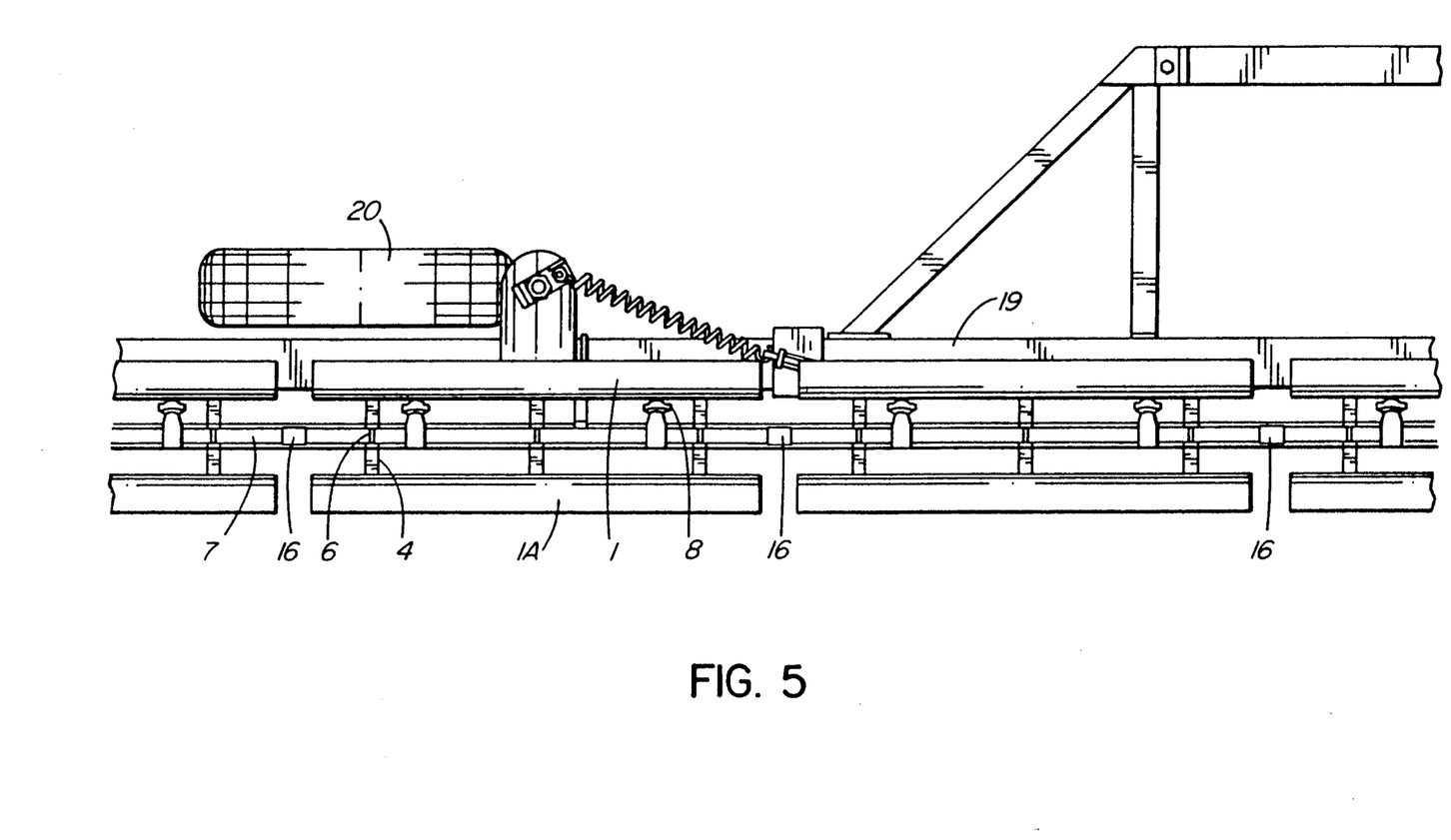
FIG. 5 is a top view of a left wet spray boom with pairs of shields mounted thereon, said boom being in the transport position.
Figure 6:
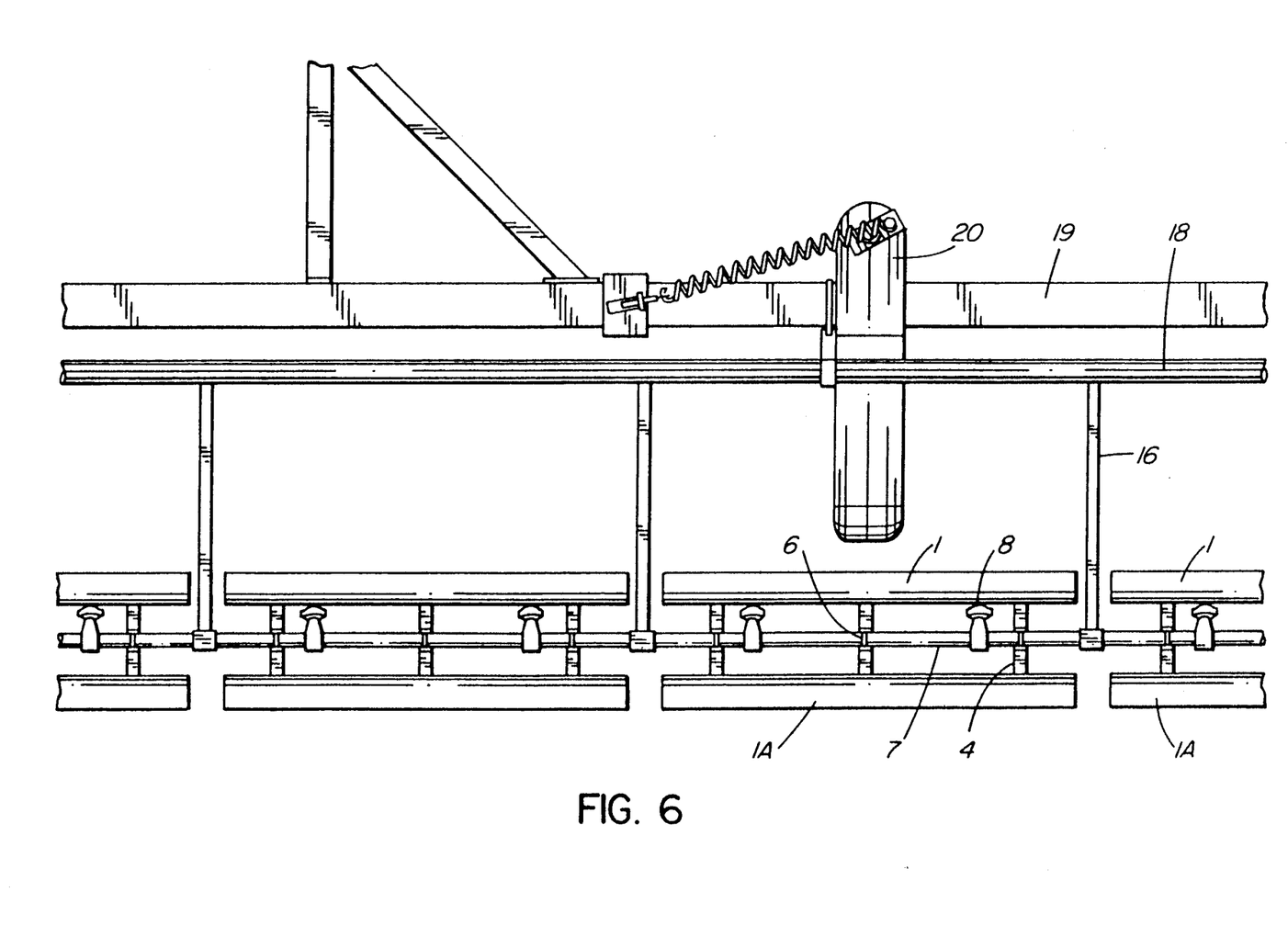
FIG. 6 is a top view of the right wing boom of an agricultural sprayer, showing the wet spray boom in the field position.
Figure 7:
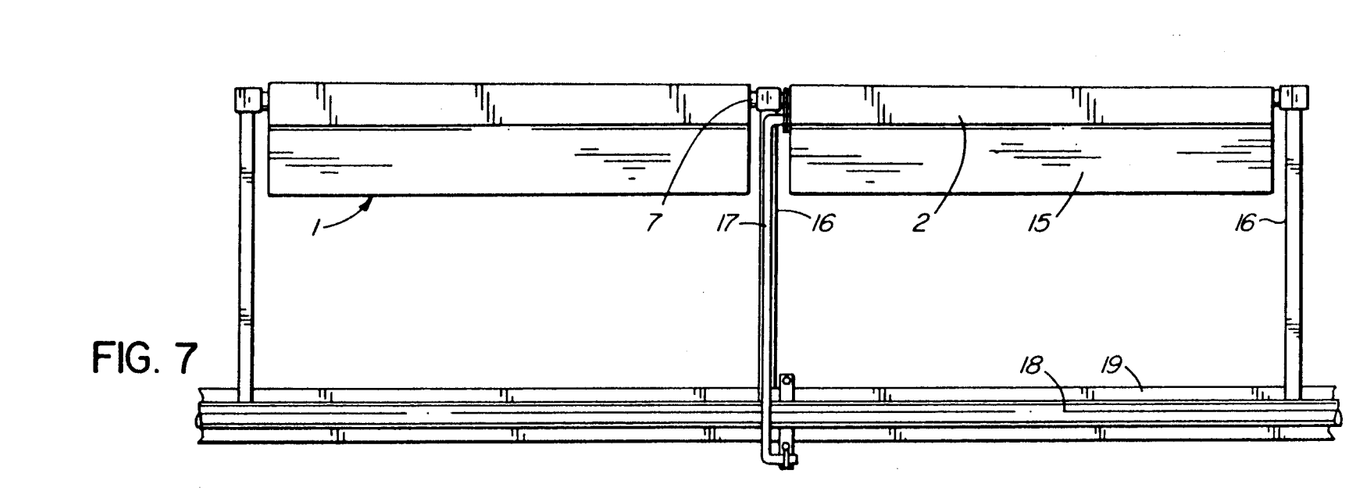
FIG. 7 is a rear view of the wet and dry spray boom and the left main wing boom of an agricultural sprayer in the transport position.
Figure 8:
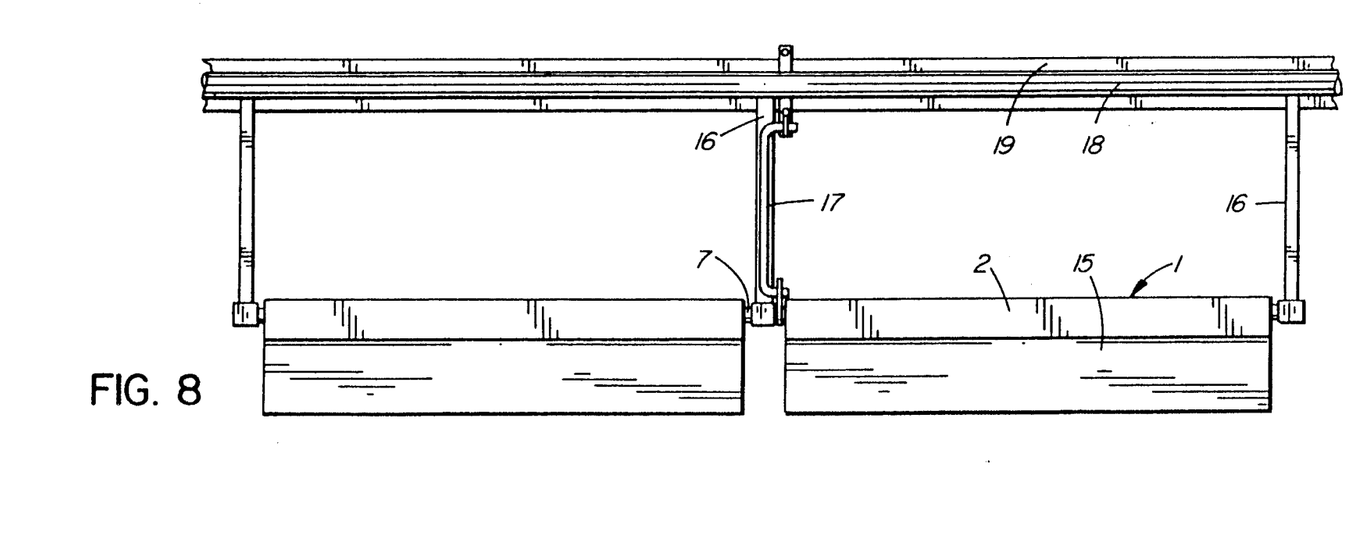
FIG. 8 is a similar drawing illustrating the wet spray boom in the field position.
Figure 9:
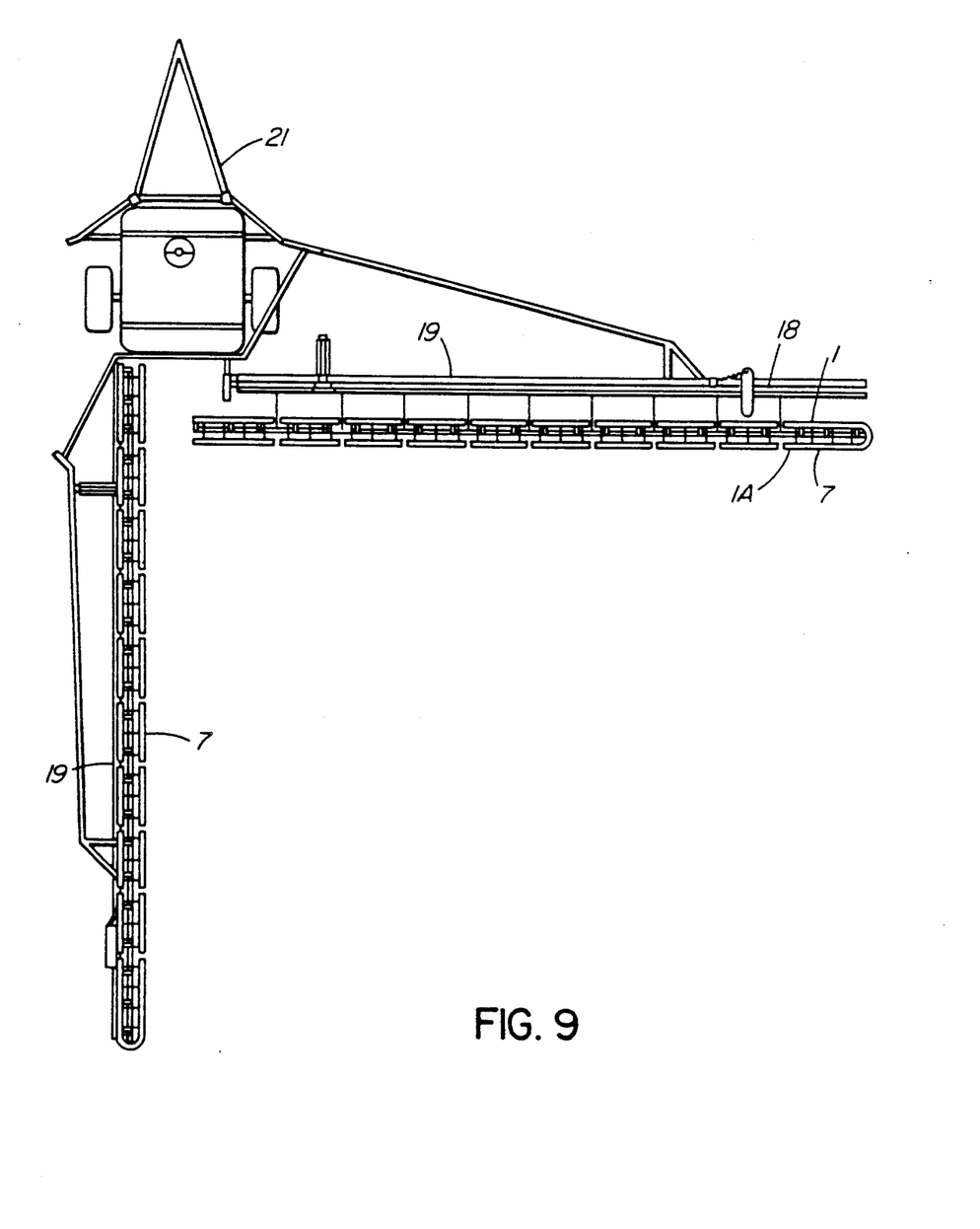
FIG. 9 is a top view of an agricultural liquid sprayer having a right main boom in the field spraying position and the left main wing boom in the transport position.

In FIG. 1, a pair of spray shields 1 are mounted one on each side of a wet spray boom 7. The direction of the sprayer implement is shown as (A) and the direction of the wind is shown as (B). In other words, the direction of the spray implement is towards the wind and the spray booms are arranged transverse to the direction of the wind and transverse to the direction of the power source. The spray shield 1 comprises an air intake opening 2 and an air outlet opening 3. Although not shown in FIG. 1, these openings extend throughout the length of the shield 1. The shield 1 is mounted on a frame 4 which is attached to a block 5 through which passes a clamp 6 which secures the frame 4 to the wet boom 7.

In operation, the implement is towed by a suitable power source such as a tractor or a truck, in the direction marked as (A). Preferably, the vehicle is towed in a direction towards the prevailing wind shown in FIG. 1 as (B). Air enters the intake opening 2 at approximately the same speed as that of the vehicle added to the velocity of the oncoming wind (B). As the air passes through the spray shield 1, it is constricted thereby increasing in velocity when it leaves the outlet opening 3 thereby producing a downwardly directed primary air curtain marked as 9. Below the opening, air marked as 10 is deflected downward by the concave lower portion of the spray shield and forms a secondary curtain of air. The secondary curtain of air joins together with the primary curtain of air. This curtain of downwardly directed air is strong enough to deflect the remaining wind below the shield shown as 11 such that it is also deflected downwards. The inertia of the wind and the forward movement of the vehicle (A) tend to press the air curtain slightly rearwardly as it approaches the ground or crop at a point shown as 12.

The spray from the sprayer 8 is directed downwardly and forwardly at approximately a 20° angle to meet the downwardly directed air curtain near the ground 12. In this manner, the spray is basically undisturbed until it actually reaches the crops.

In FIG. 1, an alternative embodiment of the invention is shown in the left spray shield. Adjustable baffles 23 and 25 are located near the inlet and outlet, respectively, and are pivotally adjustable on pivots 22 and 24, respectively. Obviously, by adjusting the baffles, the rate of flow of the curtain of air exiting the outlet can be varied.

As everyone is aware, it is not practical to always spray in a direction towards the oncoming wind. When the operator reaches the end of the field, it is necessary to turn around and spray in the opposite direction. FIG. 2 depicts such a situation wherein the sprayer is moving in the direction marked as (A) and the wind is moving in the same direction marked as (B). In other words, the wind is blowing towards the rear of the implement. Depending of course on the speed of the implement, air will enter the shield 1 through opening 2 and produce an air curtain marked as 9 or enter through opening 2(*a*) of rear shield 1(*a*) and leave through outlet opening 3(*a*). Thus in the manner shown in FIG. 1, a first curtain of air 9(*a*) and a secondary curtain 10(*a*) is produced. The two curtains together turn the remainder of the wind 11(*a*) downwards. Any wind blowing above the wet spray boom shown (line (B)) passes unobstructed above the spray shields.

FIG. 3 is a perspective view of a pair of spray shields 1 and 1(*a*) mounted along a wet spray boom 7 by means of a frame 4, block 5 and clamp 6. FIG. 3 illustrates the air intake opening 2 and air outlet opening 3 and front deflection face 15 and ends 14. When the wind blows below the opening 2 it strikes deflector face 15 and is forced downwardly in a secondary curtain of air.

FIG. 4 is a transverse cross-section of a main wing boom of a sprayer implement illustrating in dotted lines and marked as (U) the wet spray boom 7 in the upper transport position and representing in solid lines and marked as (D) the wet spray boom in the field operating position. One notes that the spray shields 1 and 1(*a*) are always substantially horizontally aligned with the wet boom 7. By means of adjustment rod 17 and fixed strut 16 the nozzles 8 are always facing 20° towards the direction of travel. FIG. 4 also shows support caster wheel 20, main wing boom 19 and the dry spray boom 18.

In FIG. 5, one views the left main wing boom 19 of a sprayer from a top view in the transport position. One notes that the support caster wheel 20 is aligned with the longitudinal axis of the main wing boom 19. One also notes that because of struts 16 which attach the dry spray boom (not visible in FIG. 5) to the wet spray boom 7, it is necessary that the spray shields 1 and 1(*a*) terminate adjacent each strut in order to avoid contact with the support struts 16.

FIG. 6 is an upper top view of a right-hand wing boom 19 of a sprayer in operating position. One notes that the support caster wheel 20 is substantially perpendicular to the wing boom 19 which is transverse to the direction of travel of the implement. One can see clearly in FIG. 6 how the fixed struts 16 which connect the dry spray boom 18 to the wet spray boom 7 must have clearance with the spray shields 1 and 1(*a*) located on either side thereof, in order for the wet spray boom to be lowered and raised between the transport and field positions.

FIG. 7 is a rear view of the wet spray boom 7 in transport position showing rear spray shield 1. The front spray shield 1(*a*) is hidden from view. One notes also that the dry spray boom 18 is in front of the main wing boom 19.

In FIG. 8, the wet spray boom 7 is in the lowered field position. Again the front spray shields 1(*a*) are hidden from view.

FIG. 9 is an overhead view of a complete agricultural sprayer wherein the right main wing boom 19 is in the field transverse position and the left main wing boom 19 is in the transport position. One notes the spray shields 1 and 1(*a*) lying adjacent the entire length of the wing along wet spray boom 7. This arrangement ensures that a substantially unbroken downwardly directed air curtain exists throughout the length of the spray boom. The dry spray boom 18 on the left wing boom which is in the transport position is almost directly below the wet spray boom 7 and therefore cannot be seen.

What I claim as my invention is:

1. A spray shield for use with an agricultural liquid sprayer of the type comprising at least one elongate wet spray boom adapted to spray when said boom is in the field position transverse to the direction of travel;

said spray shield comprising an elongate structure adapted to be positioned longitudinally adjacent said wet spray boom and having an air intake adapted to be directed horizontally away from said wet spray boom, and an air outlet adapted to be directed downwards and forwards of said spray boom;

said spray shield defining a passageway between said intake and said outlet such that during operation, air exiting through said outlet produces a downwardly directed curtain of air in front of the spray in the direction of travel thereby reducing the disruption of spray.

2. A spray shield for use with an agricultural liquid sprayer of the type comprising at least one elongate wet spray boom adapted to spray when said boom is in the field position transverse to the direction of travel;

said spray shield comprising an elongate structure adapted to be positioned longitudinally adjacent said wet spray boom and having an air intake adapted to be directed horizontally away from said wet spray boom, and an air outlet adapted to be directed downwards to one side of said spray boom;

said spray shield defining a passageway decreasing in cross-section between said intake and said outlet such that during operation, the velocity of the air exiting through said outlet is greater than the velocity of air entering said inlet thereby producing a downwardly directed curtain of air thereby reducing the disruption of spray.

3. A spray shield as claimed in claim 2, wherein said intake and said outlet extend substantially throughout the length of said shield.

4. A spray shield as claimed in claim 3, wherein said intake is larger than said outlet.

5. An agricultural sprayer comprising a plurality of spray shields as claimed in claim 2, said spray shields being arranged along a wet spray boom on either side thereof with said air intakes directed away from said wet spray boom in substantially the same horizontal plane, and air outlets directed downwardly and outwardly of said wet spray boom such that, when in operation, wind approaching said wet spray boom from either side is directed downwardly thereby creating a curtain of air on either side of said wet spray boom thereby reducing the disruption of spray.

6. An agricultural sprayer as claimed in claim 5, comprising at least two elongate wet spray booms adapted to extend transversely to the direction of travel of said sprayer, wherein said spray shields are mounted in pairs, one on each side of said wet spray boom, throughout the length thereof.

7. A sprayer as claimed in claim 6, wherein the side of said shields remote from said wet spray booms are concave between said air intakes and said air outlets such that, when in operation, wind blowing toward said wet spray boom is directed downwardly.

8. A sprayer as claimed in claim 7, wherein the sides of said shields adjacent said wet spray booms are convex between said intake and said outlet.

9. A sprayer as claimed in claim 5, wherein said air intake and said air outlets extend throughout the length of said shields.

10. A sprayer as claimed in claim 9, wherein the cross-section of said air intakes is greater than the cross-section in all dimensions of said air outlets.

11. A spray shield adapted for use on an agricultural sprayer, said spray shield comprising:

an elongate structure, comprising an air intake which is substantially horizontally directed and an air outlet which is vertically downwardly directed, one side of said spray shield being concave between said intake and said outlet and the opposite side being convex between said inlet and said outlet;

said shield being hollow and defining a passageway of decreasing cross-section between said inlet and said outlet, wherein in operation said shield is longitudinally mounted along a wet spray boom of an agricultural sprayer and in substantially the same horizontal plane as said wet spray boom, thereby directing air from the horizontal plane vertically downwards in a curtain.

12. A spray shield for use with an agricultural liquid sprayer of the type comprising at least one elongate wet spray boom adapted to spray when said boom is in the field position transverse to the direction of travel;

said spray shield comprising an elongate structure adapted to be positioned longitudinally adjacent said wet spray boom and having an air intake adapted to be directed horizontally away from said wet spray boom, and an air outlet adapted to be directed downwards to one side of said spray boom;

said spray shield defining a passageway between said intake and said outlet; at least one of said intake and said outlet being equipped with a baffle adapted to increase or decrease the opening of at least one of said intake and said outlet, such that the velocity of the air passing through said outlet will vary from that passing through said inlet; wherein, in operation air exiting through said outlet produces a downwardly directed curtain of air thereby reducing the disruption of spray.

* * * * *